L. NORMAN.
CHRISTMAS TREE HOLDER.
APPLICATION FILED FEB. 10, 1917.
1,255,557.
Patented Feb. 5, 1918.
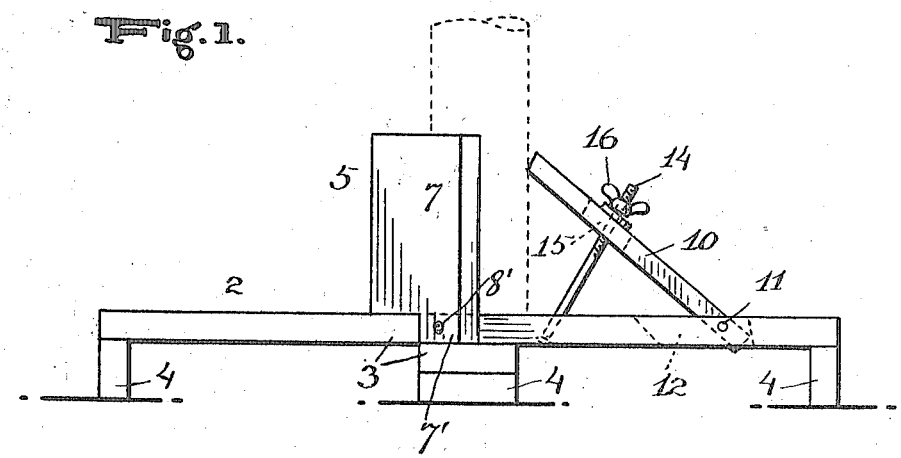
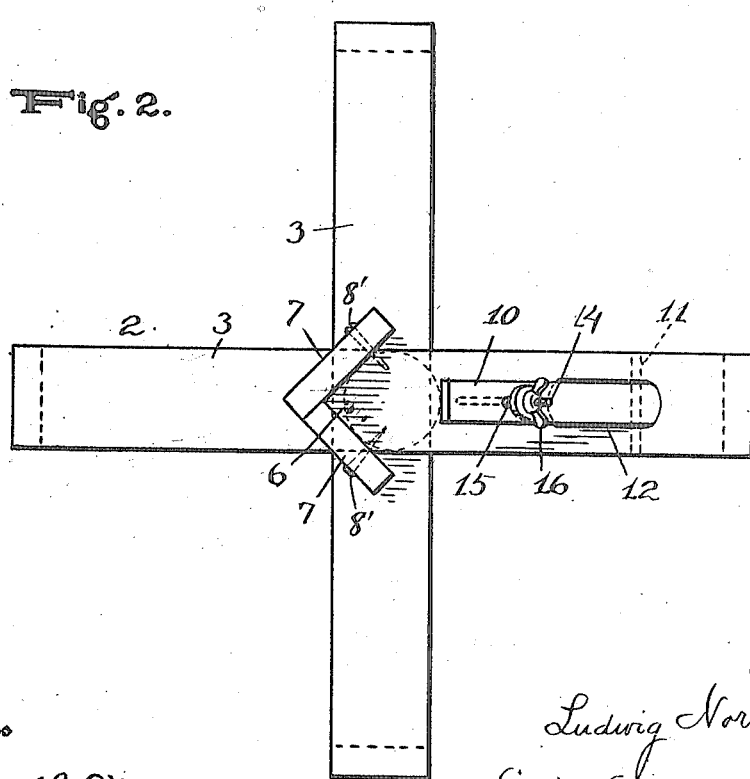

UNITED STATES PATENT OFFICE.

LUDWIG NORMAN, OF BROOKLYN, NEW YORK, ASSIGNOR, BY MESNE ASSIGNMENTS, OF ONE-HALF TO LUCIA G. ZICCARDI AND MARIA ZICCARDI.

CHRISTMAS-TREE HOLDER.

1,255,557.        Specification of Letters Patent.       Patented Feb. 5, 1918.

Application filed February 10, 1917. Serial No. 147,817.

*To all whom it may concern:*

Be it known that I, LUDWIG NORMAN, a citizen of the United States, resident of Brooklyn, in the county of Kings and State of New York, have made a certain new and useful Invention in Christmas-Tree Holders; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention.

Fig. 2 is a plan view of the same.

The invention has relation to upright staff or Christmas tree holders, having for its object to provide a simple device for the purpose that will accommodate trees having stems of various sizes, and that will hold the trees securely in upright position.

The invention consists in the novel construction and combinations of parts, as hereinafter set forth.

In the accompanying drawings illustrating the invention, the numeral 2 designates a base or support, consisting of two horizontal bars or arms 3, 3, crossing each other at right angles one superposed upon and located in a plane above the other and suitably fastened together, said arms having usually at the outer ends thereof foot blocks 4, to raise the same from the ground or floor.

Secured centrally to the base is an upright member 5, having a vertical recess 6 in its inner face, said member consisting of two vertical bars 7, intersecting at right angles, resting upon the upper of said cross-arms and having depending legs 7', straddling the same and resting upon the lower cross-arm, securing screws 8', extending through said depending legs at right angles thereto and to said bars and engaging the upper cross arm.

The lower end of the stem or trunk of the tree is placed in the vertical recess of the upright bars, the bottom of the tree resting upon the top of the upper cross bar, and in order to hold the tree stem securely in said recess, an inclined strut or clamp member 10 is pivoted at its lower end at 11, within a slot 12 of the upper cross arm and at its upper end bears against the trunk of the tree, said member having means for adjusting the same, consisting of an inclined upright bolt 14, seated at its lower end in the upper cross arm and at its upper end engaging a slot 15 of the strut, a thumb nut 16 engaging the threaded upper end of said bolt.

The inclination of the bolt 14 is opposite to that of and nearly at right-angles with relation to the strut 10, and upon adjustment of the thumb nut, the stem of the tree is easily and quickly secured in upright position, and as conveniently released, the strut member acting as a lever and being at its upper end forced strongly against the stem of the tree, to clamp it in upright postion.

I claim:

In a Christmas tree holder, a base consisting of horizontal cross arms intersecting at right-angles and one superposed upon and located in a plane above the other, an upright member having a wedge-form recess and consisting of two vertical bars intersecting at right-angles, resting upon the upper of said cross arms and having depending legs straddling the same and resting upon the lower cross arm, securing screws extending through said depending legs at right-angles thereto and to said bars and engaging the upper cross arm, said upper arm having a slot, and an oblique strut the lower end of which fits within said slot and the upper end of which has adjustable sliding engagement with the trunk of a tree located in the recess of the upright member, a pivotal bolt extending through said upper arm at the slotted part thereof and through the lower end of said strut, the latter having a slot, and an oblique bolt carried by said upper arm and extending upwardly and at about right-angles to said strut and engaging the slot thereof, and a nut threaded upon the upper end of said oblique bolt and engaging said strut.

In testimony whereof I affix my signature in presence of two witnesses.

LUDWIG NORMAN.

Witnesses:
PAUL J. RICHRATH,
J. H. MACPHEE.